(12) United States Patent
Cyrille et al.

(10) Patent No.: US 7,419,610 B2
(45) Date of Patent: Sep. 2, 2008

(54) METHOD OF PARTIAL DEPTH MATERIAL REMOVAL FOR FABRICATION OF CPP READ SENSOR

(75) Inventors: Marie-Claire Cyrille, San Jose, CA (US); Ying Hong, Morgan Hill, CA (US); Wipul Pemsiri Jayasekara, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 362 days.

(21) Appl. No.: 11/197,957

(22) Filed: Aug. 5, 2005

(65) Prior Publication Data

US 2007/0028441 A1   Feb. 8, 2007

(51) Int. Cl.
*B44C 1/22* (2006.01)
(52) U.S. Cl. .............. 216/22; 216/27; 216/66; 360/322; 360/319; 360/324.2
(58) Field of Classification Search ............ 216/22; 360/324.2; 29/603.12
See application file for complete search history.

(56) References Cited

U.S. PATENT DOCUMENTS

| 5,650,958 | A |  | 7/1997 | Gallagher et al. |
| 6,198,608 | B1 |  | 3/2001 | Hong et al. |
| 6,322,640 | B1 |  | 11/2001 | Xiao et al. |
| 6,330,136 | B1 | * | 12/2001 | Wang et al. .............. 360/324.2 |
| 6,479,353 | B2 |  | 11/2002 | Bhattacharyya |
| 6,631,055 | B2 |  | 10/2003 | Childress et al. |
| 6,700,759 | B1 |  | 3/2004 | Knapp et al. |
| 6,754,056 | B2 | * | 6/2004 | Ho et al. ................... 360/324.2 |
| 6,833,979 | B1 | * | 12/2004 | Knapp et al. ............... 360/322 |
| 6,989,971 | B2 | * | 1/2006 | Lin et al. .................. 360/322 |
| 2002/0093773 | A1 |  | 7/2002 | Pinarbasi |
| 2002/0097537 | A1 |  | 7/2002 | Shimazawa |

(Continued)

FOREIGN PATENT DOCUMENTS

JP         2004179250         6/2004

OTHER PUBLICATIONS

Yoshiyuki Fukumoto et al.; Effect of Milling Depth of the Junction Pattern on Magnetic Properties and Yields in Magnetic Tunnel Junctions; Jpn. J. Appl. Phys. vol. 41 (2002).

(Continued)

*Primary Examiner*—Nadine Norton
*Assistant Examiner*—Maki Angadi
(74) *Attorney, Agent, or Firm*—Patent Law Office of Larry Guernsey; Larry B. Guernsey

(57) ABSTRACT

A method for fabricating a read head sensor for a magnetic disk drive is presented. The method includes providing a layered wafer stack to be shaped, where the layered wafer stack includes a free layer, a barrier layer and a pinned layer. A single- or multi-layered photoresist mask is formed upon the layered wafer stack to be shaped. A material removal source is provided and used to perform a partial depth material removal within a partial depth material removal range which extends from the free layer to within the pinned layer to a partial depth material removal endpoint. In various embodiments, this depth endpoint lies at or within the barrier layer or within but not through the pinned layer.

22 Claims, 7 Drawing Sheets

U.S. PATENT DOCUMENTS

| | | |
|---|---|---|
| 2003/0086216 A1 | 5/2003 | Kagami et al. |
| 2003/0231436 A1 | 12/2003 | Nishiyama |
| 2003/0231437 A1 | 12/2003 | Childress et al. |
| 2004/0047085 A1 | 3/2004 | Liao et al. |
| 2004/0052005 A1* | 3/2004 | Zolla et al. .................. 360/322 |
| 2004/0190205 A1 | 9/2004 | Miyauchi |

OTHER PUBLICATIONS

T Niizeki et al.; Nanofabrication of magnetic tunnel junctions by using side-edge thin film deposition; Science and Technology of Advanced Materials (2003).

* cited by examiner

METHOD OF PARTIAL DEPTH MATERIAL REMOVAL FOR FABRICATION OF CPP READ SENSOR

BACKGROUND OF THE INVENTION

1. Field of the Invention

The present invention relates generally to magnetic heads for reading data written to storage media, and more particularly to magnetic read heads for disk drives.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads has become progressively smaller. This decrease in track width has allowed for dramatic increases in the recording density and data storage of disks.

Some recent read heads use a tunnel junction sensor, also known as a "tunnel valve", abbreviated "TV", for reading the magnetic field signals from the rotating magnetic data storage disk. The sensor typically includes a nonmagnetic tunneling barrier layer sandwiched between a ferromagnetic pinned layer and a ferromagnetic free layer. The pinned layer in turn is fabricated on an antiferromagnetic (AFM) pinning layer which fixes the magnetic moment of the pinned layer at an angle of 90 degrees to the air bearing surface (ABS). The magnetic moment of the free layer is free to rotate upwardly and downwardly with respect to the ABS from a quiescent or zero bias point position in response to positive and negative magnetic field signals from the rotating magnetic disk. The tunnel junction sensor layers are typically sandwiched between ferromagnetic first and second magnetic shield layers. These first and second shield layers also serve as first and second electrical lead layers, and are connected to the tunnel junction sensor for conducting a tunneling current through it. The tunneling current is preferably configured to conduct Current Perpendicular to the Planes (CPP) of the film layers of the sensor, as opposed to a sensor where a sense Current In the Planes (CIP) or parallel to film layers of the spin valve sensor. The CPP configuration is attracting more attention lately, as it can be made to be more sensitive than the CIP configuration, and thus is more useful in higher densities of tracks and data. The sensitivity of the tunnel junction sensor is quantified as magnetoresistive coefficient dr/R where dr is the change in resistance of the tunnel junction sensor from minimum resistance to maximum resistance and R is the resistance of the tunnel junction sensor at minimum resistance.

The track width and the stripe height refer to the width of the read head sensor stack and the length dimension perpendicular to the ABS. Both of these dimensions are very important to the operating characteristics of the read head and are very tightly controlled during fabrication. The trackwidth and stripe height of magnetic tunnel junctions and CPP-GMR read sensors are defined usually by ion milling. This ion milling creates redeposited material on the side of the barrier layer, which can cause unwanted barrier layer shorting.

FIG. 5 (prior art) shows a wafer stack 52 of thin film layers which is being shaped into a CPP read head sensor in a front plan view as seen from the Air Bearing Surface (ABS). The stack 52 includes a first magnetic shield 54. A first seed layer 58 is deposited upon the first magnetic shield 54. Further layers are formed in the order of an antiferromagnetic layer 60, a pinned layer 62, a barrier layer 64, a free magnetic layer 66, and a cap layer 68. It can be seen that a bridge of unwanted redeposited material 70 has been formed across the barrier layer 64, thus creating a "short" between the pinned layer 62 and the free magnetic layer 66, which can severely affect the operation of the sensor.

A shallow angle ion milling step can be conducted to remove this redeposited material. However, excessive ion milling of the sensor edge causes sensor damage, thus reducing output signal amplitude. The amount of redeposited material is higher in the case of the sharp junction profiles created when a non-undercut mask layer is used for ion milling.

Thus there is a need for a method of fabrication which eliminates creation of bridges of unwanted redeposited material which causes shorting across the barrier layer when ion milling is used to shape sensor material stacks.

SUMMARY OF THE INVENTION

A preferred embodiment of the present invention is a method for fabricating a read head sensor for a magnetic disk drive. The method includes providing a layered wafer stack to be shaped, where the layered wafer stack includes a free layer, a barrier layer and a pinned layer. A single- or multi-layered photoresist mask is formed upon the layered wafer stack to be shaped. A material removal source is provided and used to perform a partial depth material removal within a partial depth material removal range to a partial depth material removal endpoint. In various embodiments, this depth endpoint lies at or within the barrier layer or within but not through the pinned layer.

It is an advantage of the present invention that there are reduced instances of bridging material which causes short circuits between the free layer and the pinned layer of the read sensor.

It is another advantage of the present invention that manufacturing yields are improved since there are less yield losses due to shorting between the free layer and the pinned layer.

It is yet another advantage of the present invention that the amount of material removed is less, and therefore there is less redeposited material that gets thrown against the sensor, thus producing cleaner junctions, with potentially lower junction resistance.

It is a further advantage of the present invention that the total mill time is shorter, and thus there is less chance of Electrostatic Discharge (ESD) damage.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
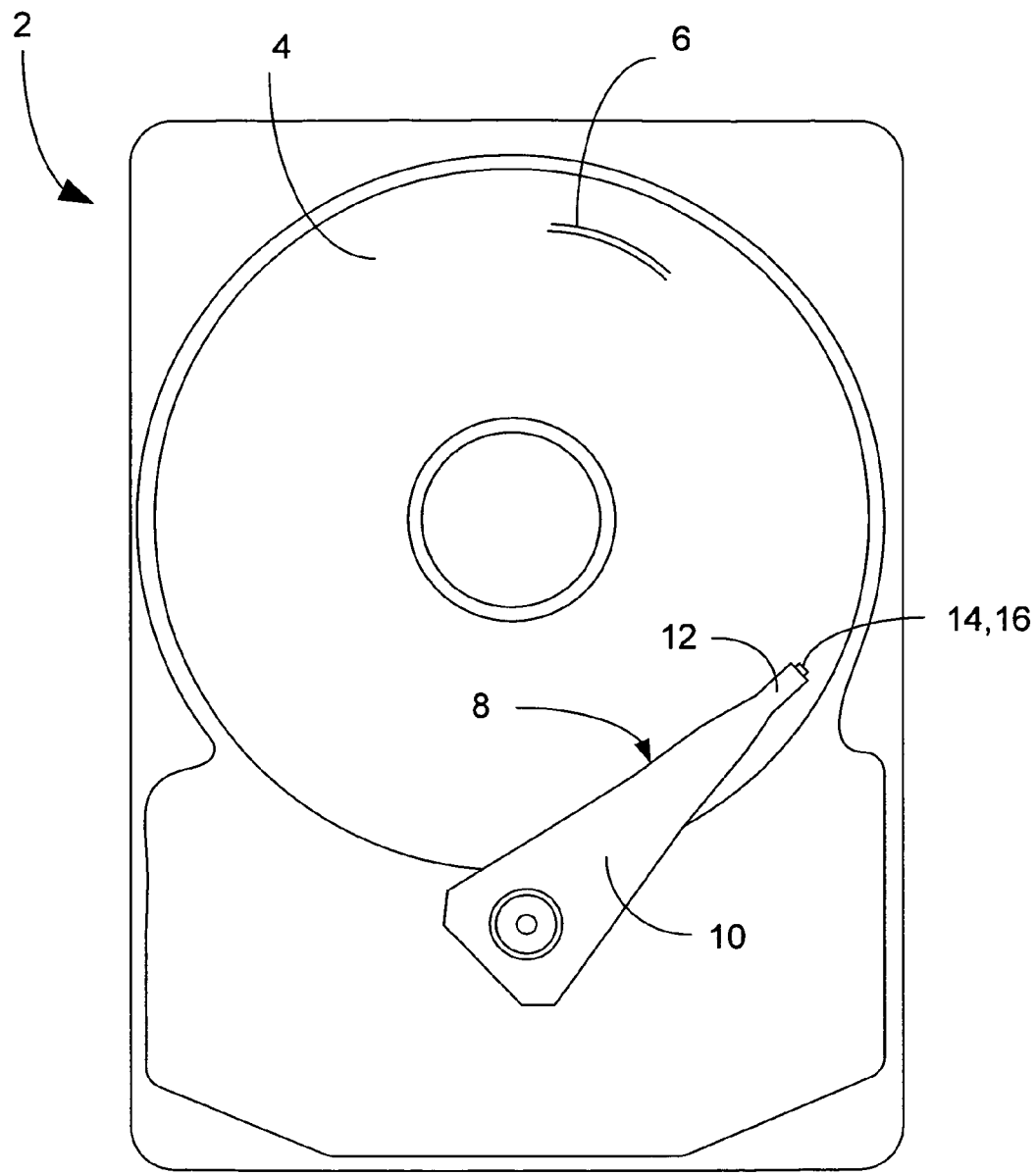
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
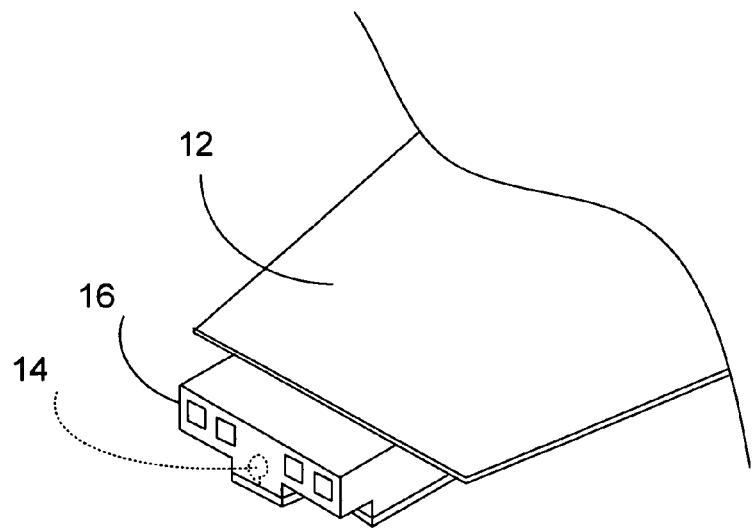
FIG. 2 illustrates a perspective view of view of an exemplary slider and suspension.
Figure 3:
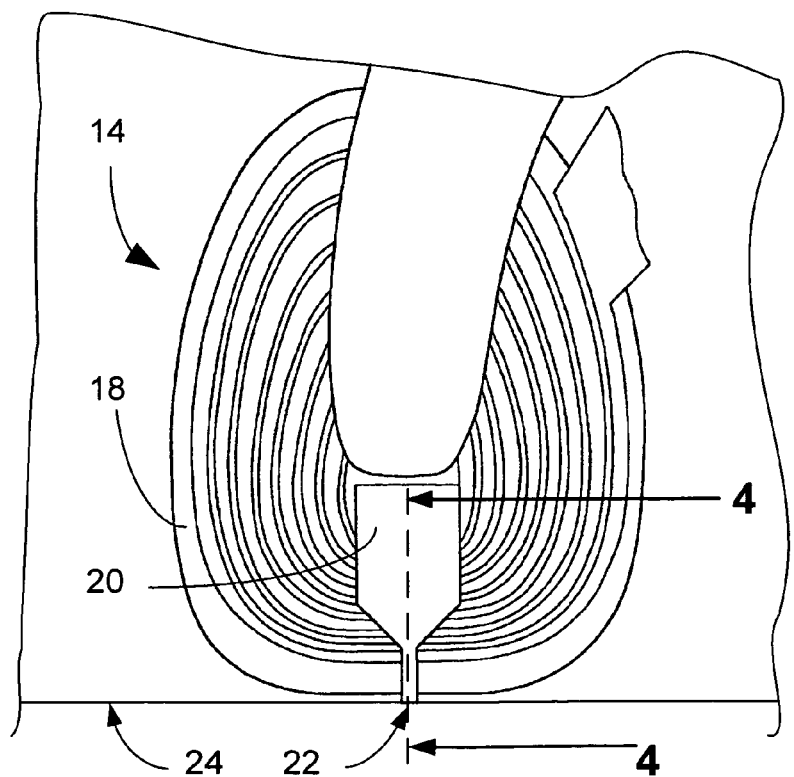
FIG. 3 shows a top plan view of an exemplary read/write head.
Figure 4:
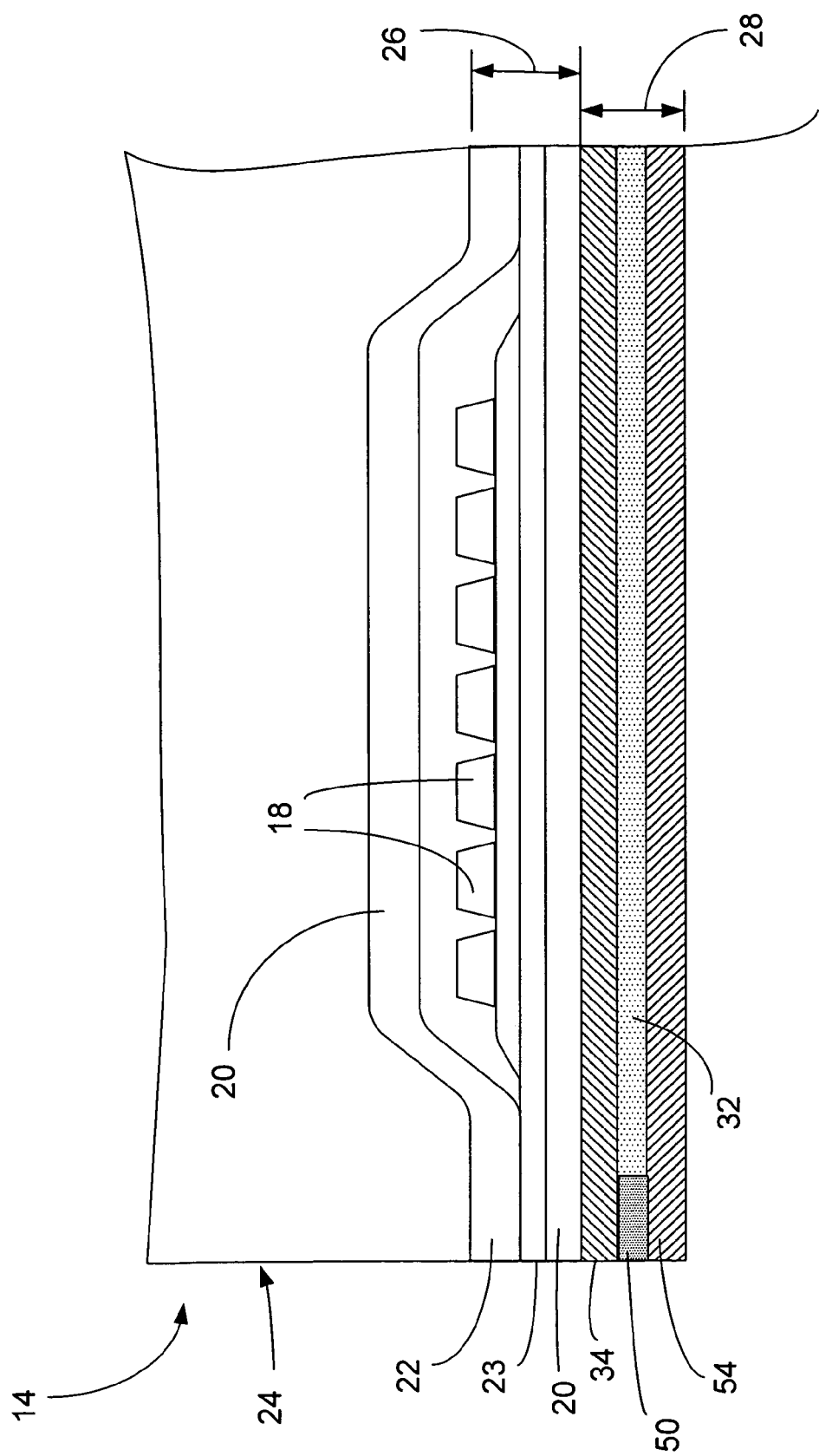
FIG. 4 is a cross-section view of an exemplary read/write head.

FIG. 2 shows a slider 16 in more detail being supported by suspension 12. The magnetic head 14 is shown in dashed lines, and in more detail in FIGS. 3 and 4. The slider shown in FIG. 4 is of a configuration known as Current Perpendicular to Plane (CPP), meaning that current flows vertically in the pictured figure rather than horizontally. The magnetic head 14 includes a coil 18, P1 pole 20, and a second pole P2 22 which is separated from P1 pole 20 by write gap 23. The P1 pole 20, second pole P2 22 and write gap 23 can be considered together to be included in the write head 26.

A read sensor 50 is sandwiched between a first shield, designated as S1 54 and a second shield S2 34, and these elements together make up the read head 28. In this configuration of read head 28 where Current is Perpendicular to the Plane (CPP), shields S1 54 and S2 34 act as electrical leads supplying current to the read sensor 50 which lies between them. An insulation layer 32 also separates the S1 54 and S2 34 electrical leads in the area behind the read sensor 50, so that they do not short out along their length. The magnetic head 14 flies on an air cushion between the surface of the disk 4 and the air bearing surface (ABS) 24 of the slider 16

Figure 6:
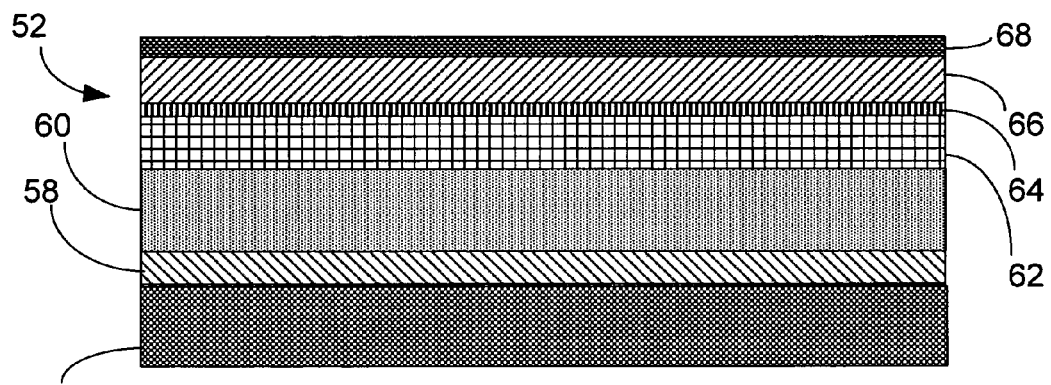
FIGS. 6-13 show front plan views as seen from the Air Bearing Surface (ABS) of various stages in the method of the present invention.

The sensor wafer stack 52 which will be shaped into a CPP read head sensor 50 is shown generally in FIG. 6, which is a front plan view as seen from the Air Bearing Surface (ABS). The stack 52 includes a first magnetic shield 54, corresponding to S1 in the previous discussion, typically comprised of NiFe, and fabricated on a substrate (not shown). A first seed layer 58 is formed upon the first magnetic shield 54. Further layers are formed on top of the seed layer 58, typically in the order of an antiferromagnetic layer 60, a pinned layer 62, a barrier layer 64, a free magnetic layer 66, and a cap layer 68.

Figure 7:
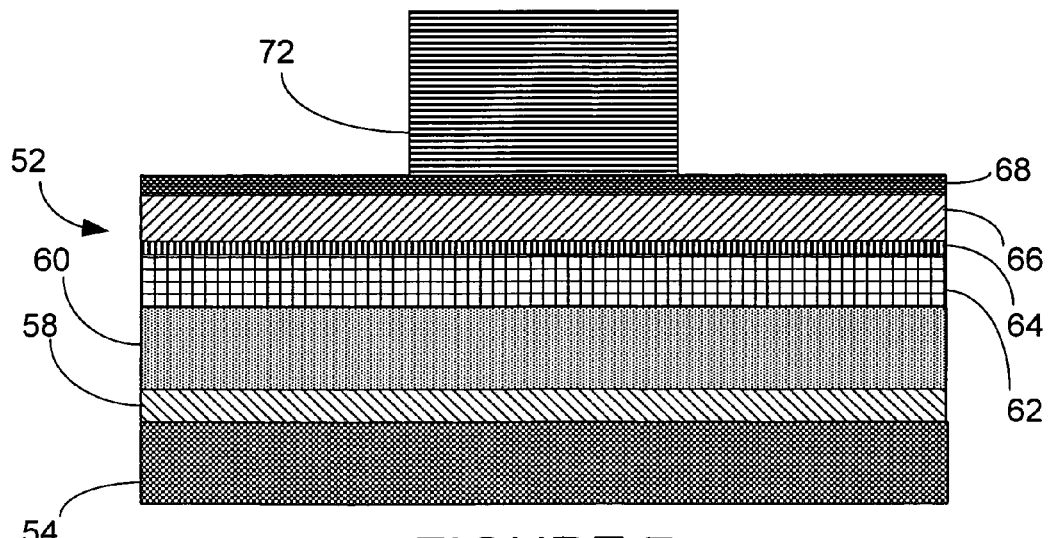

FIG. 7 shows a layer of photoresist which has been shaped into a photomask layer 72 and applied to the wafer stack 52. Note that the photomask layer 72 may be formed of a single layer, a bi-layer, a tri-layer, etc. of one or more materials. This masking material protects underlying material from removal by such processes as ion milling, and can thus be used as a shield or stencil to pattern the underlying material. This masking material consists of a top layer of photoresist or other polymer that can be patterned using photolithography techniques. Suitable resists include i-line, deep UV, and e-beam sensitive resists. The underlying layers (if used) can be polymethylglutarimide (PMGI) available from MicroChem Corp., Duramide, diamond like carbon (DLC), etc. If an underlying material is used, this would be patterned by chemical dissolution or reactive ion etching or reactive ion beam etching through the photoresist mask.

Material has been removed from the layer of photoresist to form a mask layer 72. Any suitable process, such as photolithography or reactive ion etching (RIE), can be used to remove the material. The mask layer 72 is then used as a mask for ion milling/reactive ion beam etching or sputter etching to remove material of the wafer stack 52 at the exposed areas around the mask layer 72.

Figure 5:
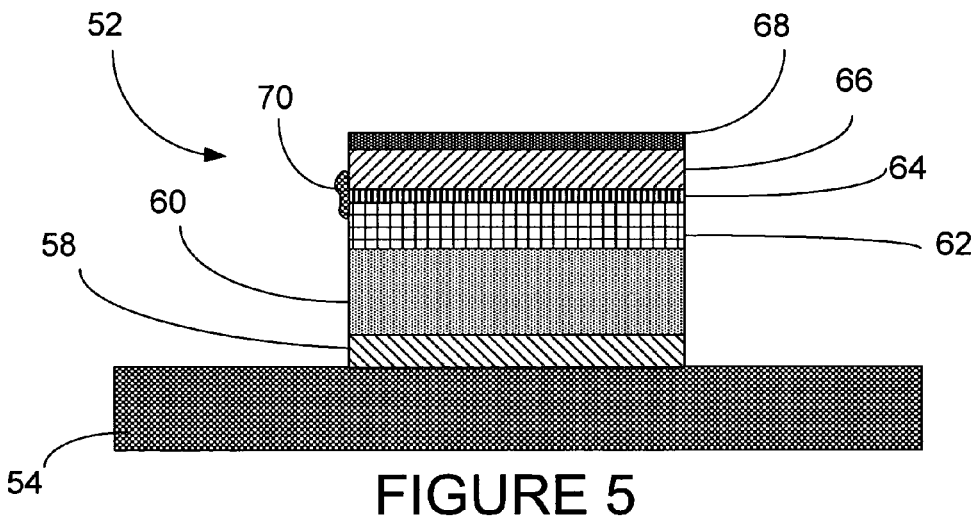
FIG. 5 shows a front plan view as seen from the Air Bearing Surface (ABS) of a wafer stack of the prior art having bridging material which causes a short circuit.

However, as discussed above, in the prior art, this milling process commonly causes redeposition of material on the sides of the shaped wafer stack. The prior art discussed above in regard to FIG. 5 (prior art), shows a bridge of unwanted redeposited material 70 has been formed across the barrier layer 64, thus creating a "short" between the pinned layer 62 and the free magnetic layer 66, which can severely affect the operation of the sensor.

In contrast, the present invention presents methods of fabrication to produce sensors in which the formation of short circuits through the formation of bridging material, as seen in the prior art, is reduced or eliminated. For this reason, partial depth material removal is done into or to a point before or partially through the pinned layer 62 to produce the structures seen in FIGS. 8-13. Thus, the term "partial depth material removal" as used for purposes of this application will include ion milling processes that use a sharp angle removal process or Reactive Ion Etching (RIE) that extends at least through the free magnetic layer 66, and possibly a portion or all of the barrier layer 64, but stops short of milling completely through the pinned layer 62. There may be additional process stages at various angles by the ion milling beams which do extend through the pinned layer 62 and into the AFM layer 60, and these will still be considered to fall within the definition of partial depth material removal as used here, as long as the initial steep angle material removal is done only up to or through the barrier layer or partially through the pinned layer 62.

For this reason, the partial depth material removal operation will be defined to extend within a range designated as the partial depth material removal range 61 (see FIG. 8) which will extend, at its farthest extent, to within but not through the pinned layer 62. There are basically four variations of partial depth material removal that will be discussed in this application Within this partial depth material removal range 61, there will be a partial depth material removal endpoint, which will be designated as 63, 65, 67, and 69 in the four variations discussed below. These four variations of partial depth material removal that will be discussed in this application are not to be construed as a limitation, and those skilled in the art will find other variations than these four which fall within the definition presented here.

Figure 8:
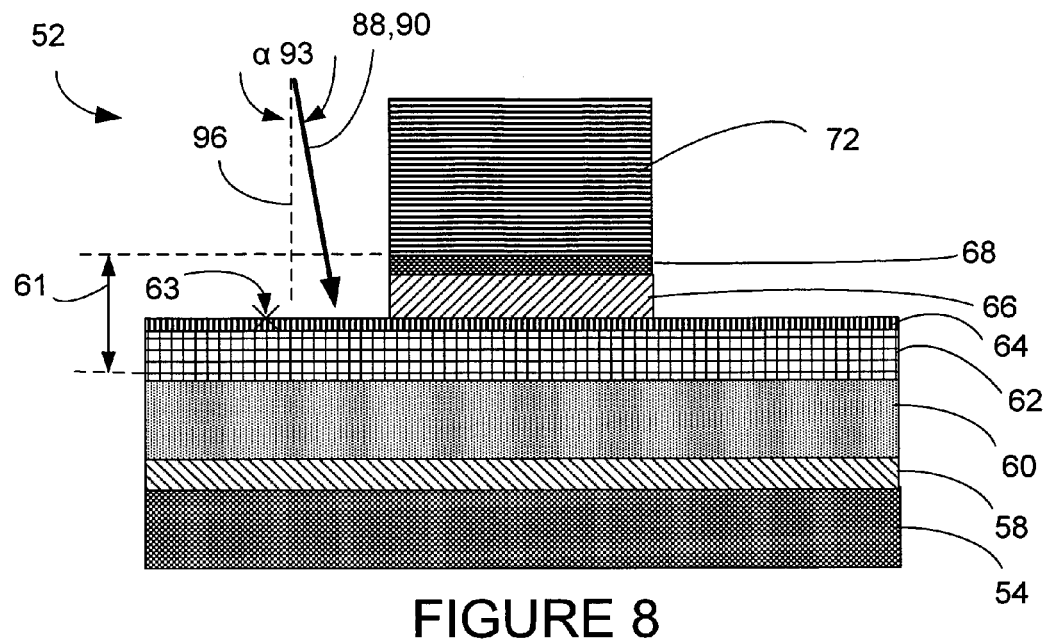

A first example is shown in FIG. 8, in which a partial depth material removal range 61 extends through the cap layer 68 and free layer 66, barrier layer 64, and into but not through the pinned layer 62, as indicated by the arrow 61. In this specific example, the partial depth material removal endpoint 63 is located at the top of the barrier layer 64. In this example, the material removal process is preferably implemented by use of a material removal source 88, which in this case will be a steep angle ion milling beam 90 set at an angle α 93 preferably in the range of 0-20 degrees from normal, as indicated by dashed line 96. The angle may be set by angling the ion milling beam source 90 relative to the wafer stack 52 to be shaped, or by angling the wafer stack 52 to be shaped relative to the ion milling beam source 90.

Figure 9:
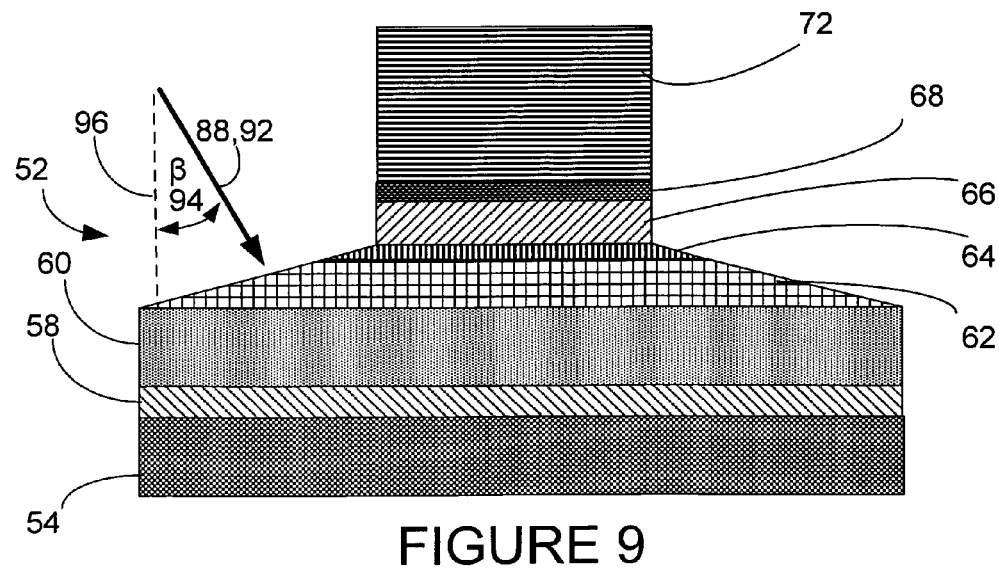

This steep angle ion milling beam 90 is used to trim the cap layer 68 and free layer 66 to the desired track width, which is preferably less than 150 nm ($150 \times 10^{-9}$ meters) wide. As depicted in FIG. 9, the remaining material will be eventually trimmed to a width in the range of 500 nm to 100 μm ($100 \times 10^{-6}$ meters) and it is to be understood that no attempt has been made to draw these elements to scale. It is apparent that bridging material 70 (see FIG. 5 prior art) cannot form between the pinned layer 62 and the free layer 66 since the pinned layer 64 lies completely beneath the barrier layer 64. In a second application of the material removal source 88, a shallow angle ion milling beam 92, is then used, preferably at an angle β 94 in the range of 30-70 degrees from normal incidence, as indicated by dashed line 96 in FIG. 9. This ion milling stage will mill through the barrier layer 64 into the pinned layer 62, and possibly into the AFM layer 60 to achieve desired depth and profile. Since a shallow angle is used for this process, minimal redeposited material will form on the side of the barrier layer 64. Once again, the angle may be set by angling the ion milling beam source 92 relative to the wafer stack 52 to be shaped, or by angling the wafer stack 52 to be shaped relative to the ion milling beam source 92.

It is to be understood that after the initial partial depth material removal operation, it is preferred that subsequent applications of the material removal source are not limited to a single subsequent application, but may involve a sequence of applications at different angles.

Figure 10:
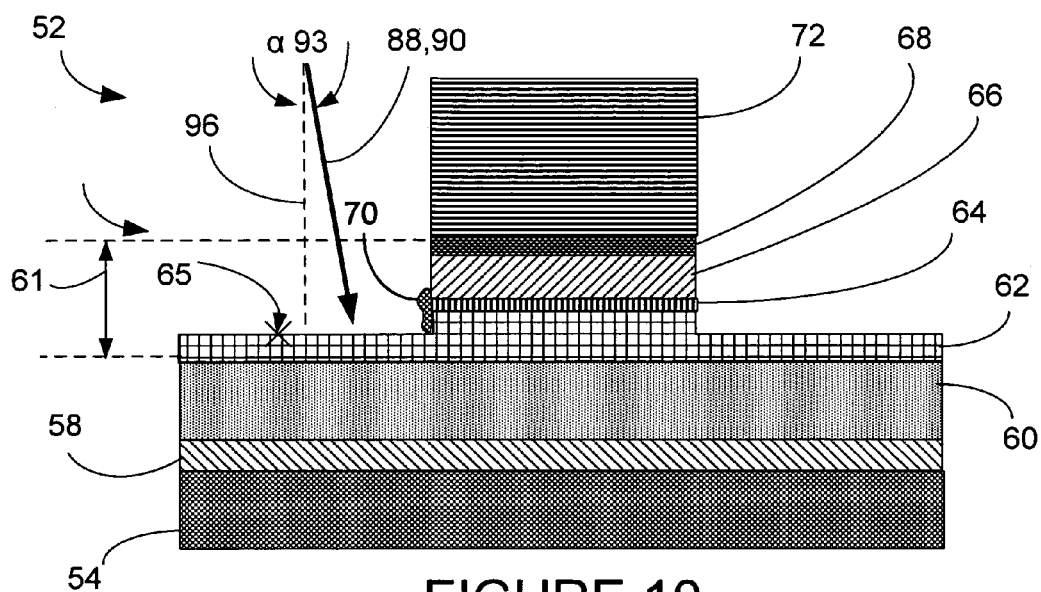
Figure 11:
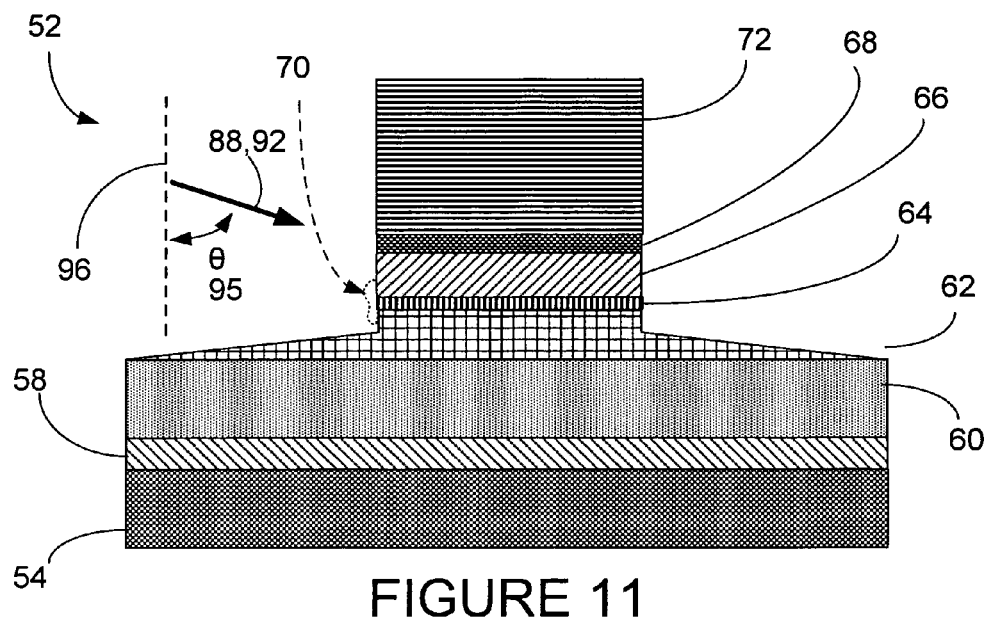

A second example of a partial depth removal is shown in FIG. 10, in which the partial depth material removal range 61 again extends through the cap layer 68 and free layer 66, barrier layer 64, and into but not through the pinned layer 62. In this specific example the material removal extends to a partial depth material removal endpoint 65 which extends into, but not through, the pinned layer 62. In such a case, the AFM layer 60 will not be reached during the initial shaping by the material removal source 88, which in this case will also be a steep angle ion milling beam 90 at an angle α 93 preferably in the range of 0-20 degrees from normal, as indicated by dashed line 96. As this operation may result in the redeposition of bridging material 70, as depicted in FIG. 11, it is preferably followed by a second application of the material removal source 88, a shallow angle ion milling beam 92, preferably at an angle θ 95 in the range of 50-89 degrees from normal incidence, as indicated by dashed line 96. As indicated by the dashed line and outline of the material, the bridge material 70 has now been removed.

Figure 12:
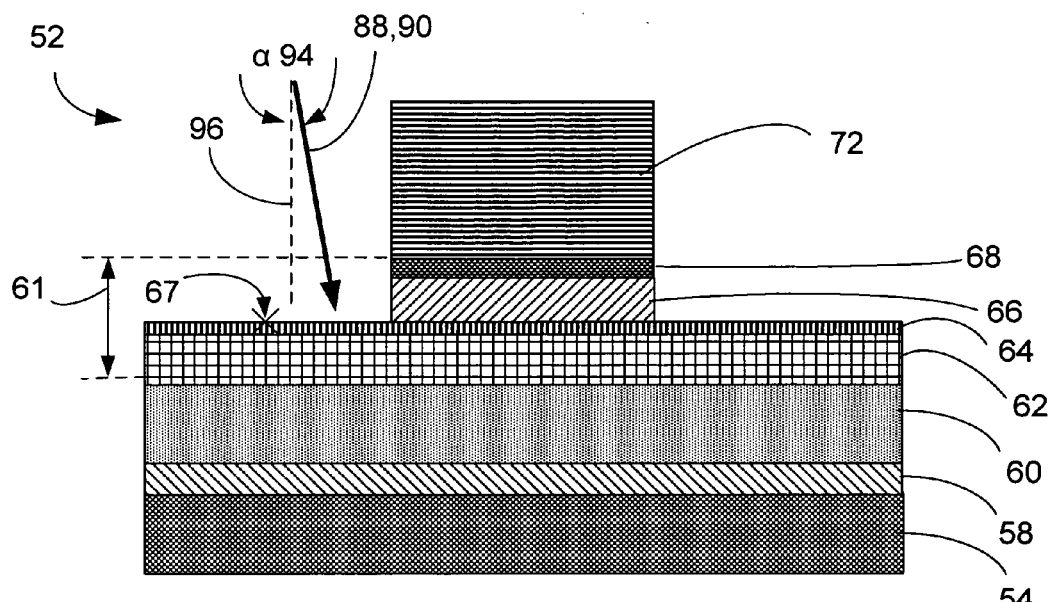

A third example of a partial depth removal is shown in FIG. 12, in which the partial depth material removal range 61 again extends through the cap layer 68 and free layer 66, barrier layer 64, and into but not through the pinned layer 62. The material removal extends to a partial depth material removal endpoint 67 as shown in FIG. 12. A material removal source 88, which in this case will again be a steep angle ion milling beam 90 at an angle α 94 preferably in the range of 0-20 degrees from normal, as indicated by dashed line 96. The partial depth material removal implemented by the steep angle ion milling beam 90 extends through the cap layer 68 and free layer 66, but stops at the barrier layer 64. It thus has a partial depth material removal endpoint 67, which is located at the top of the barrier layer 64, but preferably not extending into it. Reactive gas chemistries may be used to enhance the selectivity of the material removal process to the sensor barrier layer 64, allowing the etching to stop without passing through the barrier layer 64.

Figure 13:
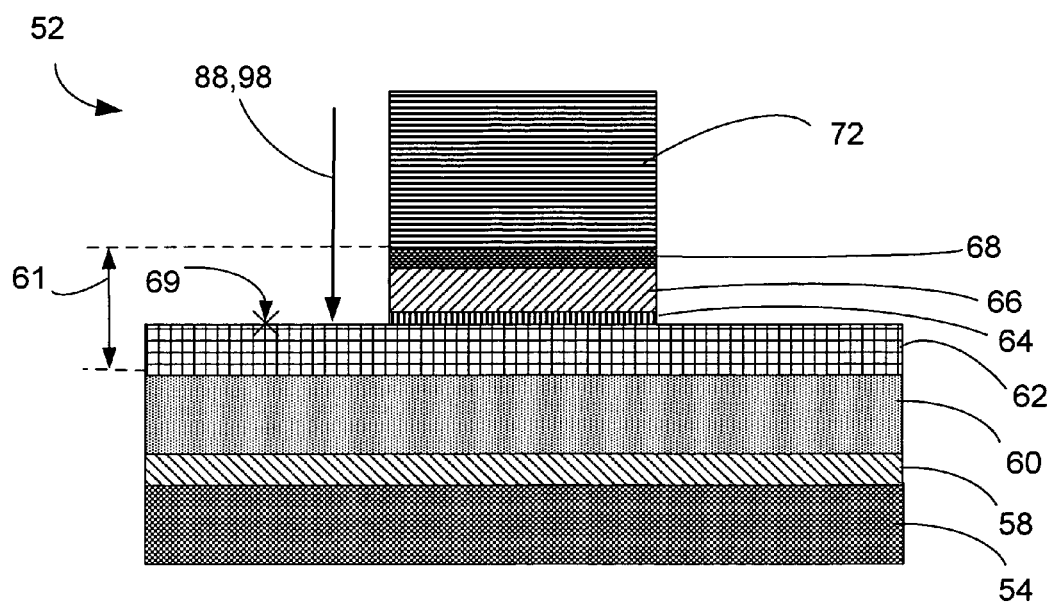

A fourth example of a partial depth material removal is shown in FIG. 13, in which the partial depth material removal range 61 again extends through the cap layer 68 and free layer 66, barrier layer 64, and into but not through the pinned layer 62. A material removal source 88, which in this case will be Reactive Ion Etching (RIE) 98, is used to etch up to or through the barrier layer 64. The RIE process will be represented by an arrow 98 symbolizing the appropriate partial depth removal. The partial depth material removal implemented by the RIE 98 extends through the cap layer 68 and free layer 66, and at least to the barrier layer 64, but stops at least at the pinned layer 62. It thus has a partial depth material removal endpoint 69, which is located, at the furthest, at the top of the pinned layer 64, but not extending into it, but may be at the top of the barrier layer 64. Once again reactive gas chemistries may be used to enhance the selectivity of the material removal process to the sensor barrier layer 64, allowing the etching to stop on or through the barrier layer 64. Using this approach, the by-products of etching get pumped out at end the end of the RIE process, and therefore there is no redeposition.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a read head sensor for a magnetic head comprising:
   A) providing a layered wafer stack to be shaped, said layered wafer stack including a free layer, which is formed on a barrier layer, which is formed on a pinned layer, which is formed on an AFM layer;
   B) forming a photoresist mask upon said layered wafer stack to be shaped;
   C) providing a material removal source; and
   D) using said material removal source to perform a partial depth material removal through said free layer to within a partial depth material removal range which extends from the top of said barrier layer to the bottom of said pinned layer.

2. The method of shaping of claim 1, wherein:
   said partial depth material removal extends to a partial depth material removal endpoint which lies at the top of said barrier layer.

3. The method of shaping of claim 1, wherein:
   said partial depth material removal extends to a partial depth material removal endpoint which lies within said barrier layer.

4. The method of shaping of claim 1, wherein:
   said partial depth material removal extends to a partial depth material removal endpoint which lies at the top of said pinned layer.

5. The method of shaping of claim 1, wherein:
   said partial depth material removal extends to a partial depth material removal endpoint which lies within said pinned layer.

6. The method of shaping of claim 1, wherein:
   said material removal source is steep angle ion milling.

7. The method of shaping of claim 6, wherein:
   said steep angle ion milling is performed within a range of 0-20 degrees from normal to the layered wafer stack.

8. The method of shaping of claim 2, wherein:
   said material removal source is steep angle ion milling which is followed by shallow angle ion milling which is performed within a range of 30-70 degrees from normal to the layered wafer stack.

9. The method of shaping of claim 5, wherein:

said material removal source is steep angle ion milling which is followed by shallow angle ion milling which is performed within a range of 50-89 degrees from normal to the layered wafer stack.

10. The method of shaping of claim 1, wherein:

material removal source is Reactive Ion Etching.

11. The method of shaping of claim 6, wherein:

said steep angle ion beam milling is followed by Reactive Ion Etching.

12. A method for fabricating the read head of a magnetic disk drive comprising:

A) forming at least one pinned layer on an AFM layer;

B) forming a barrier layer on said at least one pinned layer;

C) forming a free layer on said barrier layer;

D) forming a cap layer on said free layer to comprise a wafer stack;

E) forming a mask layer on said cap layer to mask a portion of said wafer stack; and F) removing material from said wafer stack with a material removal source through said free layer to within a partial depth material removal range which extends from said free layer to within said pinned layer, said partial depth material removal range extending to a partial depth material removal endpoint.

13. The method of shaping of claim 12, wherein:

said removing material extends to said partial depth material removal endpoint which lies at the top of said barrier layer.

14. The method of shaping of claim 12, wherein:

said removing material extends to said partial depth material removal endpoint which lies within said barrier layer.

15. The method of shaping of claim 12, wherein:

said removing material extends to said partial depth material removal endpoint which lies at the top of said pinned layer.

16. The method of shaping of claim 12, wherein:

said removing material extends to said partial depth material removal endpoint which lies within said pinned layer.

17. The method of shaping of claim 12, wherein:

said material removal source is steep angle ion milling.

18. The method of shaping of claim 17, wherein:

said steep angle ion milling is performed within a range of 0-20 degrees from normal to the layered wafer stack.

19. The method of shaping of claim 13, wherein:

said material removal source is steep angle ion milling which is followed by shallow angle ion milling which is performed within a range of 30-70 degrees from normal to the layered wafer stack.

20. The method of shaping of claim 16, wherein:

said material removal source is steep angle ion milling which is followed by shallow angle ion milling which is performed within a range of 50-89 degrees from normal to the layered wafer stack.

21. The method of shaping of claim 12, wherein:

material removal source is Reactive Ion Etching.

22. The method of shaping of claim 17, wherein:

said steep angle ion beam milling is followed by Reactive Ion Etching.

* * * * *